United States Patent
Paffenholz (12)

(10) Patent No.: US 6,188,963 B1
(45) Date of Patent: Feb. 13, 2001

(54) METHOD AND SYSTEM FOR DERIVING RECEIVER SEPARATION AND DEPTH DUAL PHONE SEISMIC SURVEYS

(75) Inventor: Josef Paffenholz, Missouri City, TX (US)

(73) Assignee: Baker Hughes Incorporated, Houston, TX (US)

( * ) Notice: Under 35 U.S.C. 154(b), the term of this patent shall be extended for 0 days.

(21) Appl. No.: 09/351,514

(22) Filed: Jul. 12, 1999

(51) Int. Cl.[7] ........................................... G01V 1/28
(52) U.S. Cl. ................................. 702/17; 367/24
(58) Field of Search .................. 702/17, 18; 367/24, 367/21, 6, 15, 19, 117

(56) References Cited

U.S. PATENT DOCUMENTS 5,696,734 * 12/1997 Corrigan .................................. 367/24
5,774,417 * 6/1998 Corrigan et al. ........................ 367/24

* cited by examiner

Primary Examiner—Donald E. McElheny, Jr.
(74) Attorney, Agent, or Firm—Gerald E. Lester

(57) ABSTRACT

A method for accurately determining travel time separation between dual vertically spaced hydrophones below a water surface to achieve separation of pressure wavefields into an up-going and a down-going wavefield in the frequency domain, and for accurately determining the depth of a vertical mid-point between the dual hydrophones below the water surface.

13 Claims, 4 Drawing Sheets

METHOD AND SYSTEM FOR DERIVING RECEIVER SEPARATION AND DEPTH DUAL PHONE SEISMIC SURVEYS

FIELD OF THE INVENTION

The invention relates generally to methods of conducting seismic surveys, and more particularly to a method for determining the depth and travel time separation between vertically separated hydrophones that are used to conduct the survey.

BACKGROUND OF THE INVENTION

In underwater seismic exploration, energy sources are used to create compressional waves that propagate through the water and into underwater land formations. Interfaces between different strata in the land formation reflect the compressional waves back toward a receiver. The receivers commonly used in such underwater seismic explorations are hydrophones which convert the compressional or pressure waves into electrical signals. The signals in turn are processed to form a structural image of the subterranean formation.

Prior art of general interest include the following:

U.S. Pat. No. 3,371,310 discloses a system comprised of vertically disposed components including a seismic generator at or near the earth's surface, a plurality of down-reflecting interfaces below the generator, and a directional seismic-wave detector sensitive to vertical wave travel below the down-reflecting surfaces. Vertically traveling waves received by the detector are phonographically recorded, and through use of the directional properties of the detector are separated into up-traveling and down-traveling seismic waves. The down-traveling seismic waves are modified by omitting the direct waves, and thereafter are mathematically convolved with an up-traveling wave. The resulting convolution function contains events at the times of multiple reflections, but not at the times of primary reflections, and therefore is useful in substantially eliminating, multiple reflections from the seismic wave traces. No calculation of up- and down-going wavefields is made. Further, no determination is made of travel time separation between vertically separated hydrophones, travel time between the surface of the water and a mid-point between the hydrophones, or depth of the midpoint.

U.S. Pat. No. 4,809,239 discloses a method of separating seismic waves into compression and shear plane waves, and deriving the velocity and direction of propagation of the plane waves to provide a best fit of the plane wave model to the seismic measurements. More particularly, transducers are placed vertically in a borehole to form an x-z plane intersecting a formation. When an acoustic source is excited at the surface of the formation, compression and shear waves are detected at the transducers to obtain a plural axis measurement of formation displacement. At each transducer depth, compression and shear wave velocities and angles of incidence relative to the x-z axis are estimated, and the phase shifts of the compression and shear waves at each transducer are calculated as a function of the estimates. In addition, a predetermined error function is calculated as a function of the phase shifts, and the estimated velocities and angles of incidence associated with the least predetermined error within a predetermined tolerance are selected. No calculation of up- and down-going wavefields is made, and no determination is made of travel time separation between vertically separated hydrophones, travel time between the surface of the water and a mid-point between the hydrophones, or depth of the midpoint. Further, the patent deals with the separation of pressure and shear waves, rather than the separation of pressure waves into up-going and down-going waves.

U.S. Pat. No. 4,935,903 discloses a method and system comprising a seismic energy source, a detector (vertically spaced hydrophones or pressure sensors), a wavefield separator for separating seismic waves into upward traveling and downward traveling components, a time shift element for aligning the components, and a signal enhancement element for forming an improved seismic reflection signal which is subjected to NMO correction. No determination is made of travel time separation between vertically separated hydrophones, travel time between the surface of the water and a mid-point between the hydrophones, or depth of the midpoint. Further, rather than achieve wavefield separation through an accurate determination of travel time separation, the patent discloses a less accurate method of using both water pressure and water particle velocity measurements to separate a wavefield into up-going and down-going components.

U.S. Pat. No. 5,005,159 discloses a method of continuity logging in which a seismic source is placed in a first vertical borehole in near proximity to a lithographic layer, and vertically spaced geophones are placed in a second vertical borehole to develop a difference signal. The differential signal is used to reduce the amplitude of primary or secondary waves, while enhancing the amplitude of guided waves. If the guided waves have appreciable amplitude, then continuity is deemed to be present in the lithographic layer. No calculation of up- and down-going wavefields is made. Further, no determination is made of travel time separation between vertically separated hydrophones, travel time between the surface of the water and a mid-point between the hydrophones, or depth of the midpoint.

U.S. Pat. No. 5,191,557 discloses a seismic signal processing method and system, which includes a drilling rig seismic source, a drilling rig reference sensor, and plural horizontally spaced surface geophones for receiving both direct and reflected seismic signals. A reference signal is cross-correlated with signals received by geophones at a distance from the borehole. As a result of the cross-correlation, drill bit generated energy can be distinguished from interference and the travelpath to a reflector may be reduced by as much as a factor of 2. Wavefield separation into direct and reflected signals occurs by exploiting moveout differences. No determination is made of travel time separation between vertically separated hydrophones, travel time between the surface of the water and a mid-point between the hydrophones, or depth of the midpoint.

U.S. Pat. No. 5,384,752 discloses a method for correcting a seismic pulse waveform for use in the deconvolution of reflected pulse data. The source pulse waveform is measured by a hydrophone positioned vertically beneath the acoustic source. A phase error is calculated based upon the depth of the source and the depth of the hydrophone, and subtracted from the phase spectrum of the measured waveform. The depth of the hydrophone is determined by the travel time to the hydrophone. The resulting waveform provides a representation of a far field waveform. No determination is made of travel time separation between vertically separated hydrophones, travel time between the surface of the water and a mid-point between the hydrophones, or depth of the midpoint.

U.S. Pat. No. 5,790,473 discloses a method and system, which include multiple seismic vibratory sources that are energized in accordance with a predetermined pattern. Seismic signals reflected by interfaces separating formations produce motions which are detected by a seismic receiver or geophone located within a borehole. The geophone is moved to different locations in the borehole to measure the motions, which are related to the actual vibrator applied force by a transfer function of a minimum phase. The pattern is used to separate the received data according to the source used to generate the detector motion, and to isolate down-traveling waves for each vibratory source. The separated received data then is correlated by using the down-traveling wave data to produce a seismogram. No calculation of up- and down-going wavefields is made. Further, no determination is made of travel time separation between vertically separated hydrophones, travel time between the surface of the water and a mid-point between the hydrophones, or depth of the midpoint.

U.S. Pat. No. 5,742,560 discloses a method of imaging a geological feature. Travel times between two different acquisition datums are determined from measurements or an assumed velocity field. The travel times are used in a wave equation extrapolation of data from actual source and receiver positions to simulated source and receiver positions. Standard imaging techniques thereafter are used to process the data from the simulated source and receiver positions. Vertically displaced sources and receivers are shown for cross-borehole surveying. No calculation of up- and down-going wavefields is made. Further, no determination is made of travel time separation between vertically separated hydrophones, travel time between the surface of the water and a mid-point between the hydrophones, or depth of the midpoint.

U.S. Pat. No. 5,581,514 discloses a seismic profile system and method using two vertical strings of vertically spaced sensors, with the vertical strings being horizontally spaced apart. The time delay for a seismic wavefield to travel from a lower sensor to an upper sensor of a sensor pair is calculated by using a cross-correlation technique. Based upon the result, the interval velocity of the medium in which the upper and lower sensors are deployed is statistically estimated. Discrimination between up-going and down-going seismic waves is accomplished. A deconvolution operator then is calculated from the downgoing wavefield, and applied to the up-going wavefield. Vertical spacing of sensors is predetermined, and not calculated. Further, depth of the receiver assembly is not considered.

U.S. Pat. No. 4,794,573 discloses a method for separating upgoing and downgoing seismic waves in a vertical seismic profile. A plurality of vertically spaced geophones are suspended by cable and in contact with the wall of the well borehole. Two geophone signals are processed at a time. The two geophone signals are summed, and the difference between the two signals is time integrated to preserve phase. The integrated difference then is amplitude scale corrected to approximate arrival times for a detector depth midway between the detector pair, and either added to the sum of the two geophone signals to enhance down-going seismic signals or subtracted from the sum to enhance up-going seismic signals. The patent does not determine receiver depth, and does not teach a division of the frequency spectra of the up-going and down-going wavefields in estimating separation distance between the geophones. Rather, the patent assumes that the zero lag cross-correlation $\phi_0(u,d)$ of the upgoing and downgoing wavefields is zero, which assumption gives rise to substantial error in the determination of the time delay of a pressure wave traveling between a detector pair mid-point and the points of acquisition.

SUMMARY OF THE INVENTION

A method and system is disclosed for determining an optimum vertical travel time $\tau_d$ from a mid-point between two vertically separated hydrophones immersed in water to one of the hydrophones, thereby providing same phase characteristics in pressure wavefields recorded by the two hydrophones, and deriving from such wavefield recordings the depth $d_{mp}$ of tie midpoint, and the vertical separation distance d between the hydrophones.

More particularly, the electronic signals produced by the dual hydrophones are each integrated over time to produce Fourier transforms of each signal. Thereafter, a travel time $\tau$ between a vertical mid-point to one of the hydrophones is estimated, and the Fourier transforms are used to calculate an up-going pressure wavefield $U_o$ and a down-going pressure wavefield $D_o$. A transfer function $F_{UD}$ between $U_o$ and $D_o$ then is calculated, and a linear frequency function $[f(\omega)=\omega \cdot \tau]$ providing a least squares fit to the argument or phase function PF of $F_{UD}$ is determined. An RMS error between the linear frequency function $f(\omega)$ and the phase function PF is recorded, and the above process beginning with the calculation of Uo and Do is repeated for a range of $\omega$ estimates. The travel time associated with the minimum recorded RMS error is selected as the optimum value of $\tau$, which is $\tau_d$. The phase function PF for $\tau=\tau_d$ then is determined, and $\tau_o$ is derived from PF, and $d_{mp}$ is derived from $\tau_o$.

In one aspect of the invention, a method of accurately determining the travel time separation $\tau$ from a midpoint between vertically separated hydrophones and one of the dual hydrophones is used to cause substantially same phase characteristics between the up-going pressure wavefield $U_o$ and the down-going pressure wavefield $D_o$, thereby accommodating an accurate separation of the up-going pressure wavefield $U_o$ from the down-going pressure wavefield $D_o$.

In another aspect of the invention, phase wrapping is avoided in the determination of RMS error between a phase function PF of a transfer function $F_{UD}$ between the up-going and down-going pressure wavefields, and a linear frequency function $f(\omega)$ that is determined from a least squares fit to the phase function PF. More particularly, rather than comparing PF and $f(\omega)$, cos (PF) is compared with cos ($\omega \cdot \tau$), or sin (PF) is compared with sin ($\omega \cdot \tau$).

DESCRIPTION OF THE DRAWINGS

The accompanying drawings, which are incorporated in and constitute a part of the specification, illustrate a preferred embodiment of the invention, and together with the general description given above and the detailed description of the preferred embodiment given below, serve to explain the principles of the invention.

DESCRIPTION OF PREFERRED EMBODIMENTS

Figure 1A:
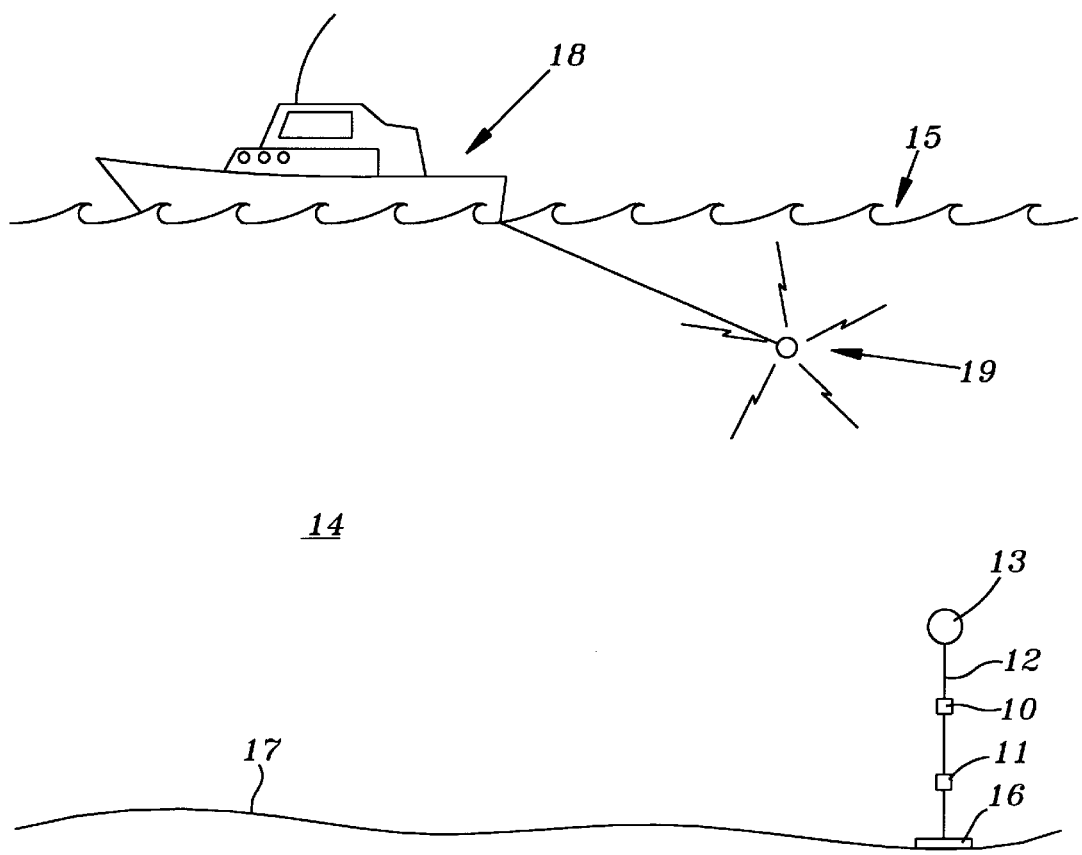
FIG. 1A is a diagram of two vertically separated hydrophones suspended by way of a float and an anchor below a water surface.

Referring to FIG. 1A, a pair of vertically spaced hydrophones 10 and 11 are attached by way of a cable 12 to a float 13, which has a recording system and is immersed in the ocean 14 beneath the ocean surface 15. Cable 12 also is attached at a point below hydrophone 11 to an anchor 16 lying on the ocean floor 17.

In operation, a boat 18 tows a seismic source 19 that emits pressure pulses which propagate in all directions, and are reflected by reflecting surfaces including the ocean surface 15 and floor 17. The hydrophones 10 and 11 respectively are in electrical communication with the recording system of float 13, and receive source and reflected seismic pressure waves which are stored on magnetic tape or other suitable storage medium in the float. The storage medium is later used by a data processing system to perform a wavefield component separation as will be explained in more detail below.

Figure 1B:
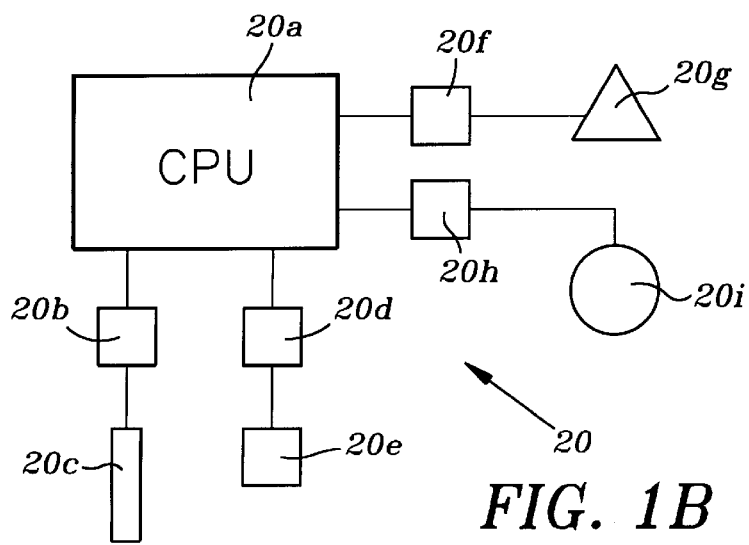
FIG. 1B is a functional block diagram of a data processing system for analyzing electrical signals produced by hydrophones 10 and 11 of FIG. 1A.

Referring to FIG. 1B, a data processing system 20 is illustrated for processing the electrical signals stored on the storage medium. A CPU 20a is electrically connected to a disk drive 20c by way of a disk control unit 20b, to a tape drive 20e by way of a tape control unit 20d, to a terminal 20g by way of a terminal control unit 20f, and to a printer 20i by way of a print control unit 20h.

When the electrical signals from the hydrophones 10 and 11 of FIG. 1A are stored on a storage medium, which could be a magnetic disk or tape, the storage medium is inserted into the disk drive 20c or the tape drive 20e as appropriate and accessed by the CPU 20a. The CPU 20a in turn processes the electrical signals and presents the results visually on the terminal 20g, or as information printed out by the printer 20i. The process executed by the CPU 20a is explained in detail below.

The information which is needed to perform a wavefield component separation is derived from a difference between the signals received from the dual hydrophones, and is dependent upon the travel time separation between the two hydrophones. A high degree of accuracy in the determination of the travel time separation is required to achieve satisfactory wavefield component separation.

The total wavefield $P_1$ recorded by the upper hydrophone 10 and the total wavefield $P_2$ recorded by the lower hydrophone 11 may be represented by the following frequency domain expressions for zero offset:

$$P_1(\omega) = U_0(\omega) \cdot e^{i\omega\tau} + D_0(\omega) \cdot e^{-i\omega\tau} \text{(Upper Hydrophone)} \quad (1)$$

$$P_2(\omega) = U_0(\omega) \cdot e^{+i\omega\tau} + D_0(\omega) \cdot e^{i\omega\tau} \text{(Lower Hydrophone)}, \quad (2)$$

where $\tau$ is a one-way travel time between a hydrophone and a mid-point between the vertically separated hydrophones, and $e^{i\omega\tau}$ represents a time delay of $\tau$ seconds in the frequency domain, and $U_o$ is the up-going wavefield at the vertical mid-point, $D_o$ is the down-going wavefield at the vertical mid-point, and $\omega$ is $2\pi$ times the temporal frequency f.

Further, $$\tau = \frac{d}{2V}, \quad (3)$$

where V is the velocity of sound in water, and d is the vertical separation between the dual hydrophones.

Solving the above equations for $U_0$ and $D_0$, the following equations result:

$$U_0(\omega) = \frac{P_1(\omega) \cdot e^{i\omega\tau} - P_2(\omega) \cdot e^{-i\omega\tau}}{(e^{i\omega\tau} \cdot e^{i\omega\tau} - e^{-i\omega\tau} \cdot e^{-i\omega\tau})} \quad (4)$$

$$D_0(\omega) = \frac{P_2(\omega) \cdot e^{i\omega\tau} - P_1(\omega) \cdot e^{-i\omega\tau}}{(e^{i\omega\tau} \cdot e^{i\omega\tau} - e^{-i\omega\tau} \cdot e^{-i\omega\tau})} \quad (5)$$

With the up-going and down-going wavefields being identical except for a time shift determined by the vertical depth of the mid-point between the vertically separated hydrophones, a transfer function $F_{UD}$ or cross equalization filter between $U_0$ and $D_0$ may be represented by the following linear phase term:

$$F_{UD}(\omega) = \frac{U_o(\omega)}{D_o(\omega)} = e^{i\omega\tau_o}, \text{ where} \quad (6)$$

$\tau_o$ is the two-way travel time in the water layer between the vertical mid-point of the separation distance between hydrophones, and the water surface.

Through experimentation and simulations, it has been found that the phase characteristics of wavefields recorded respectively by the upper and lower hydrophones will be the same only when an optimum vertical travel time separation between either of the dual hydrophones and a midpoint between the hydrophones has occurred. The optimum vertical travel time separation $\tau_d$ is determined by performing the following steps:

1. Integrate the electronic hydrophone signals over time to produce Fourier transforms of each signal.
2. Assume a pressure wave travel time $\tau$ from a mid-point between vertically separated hydrophones to one of the hydrophones;
3. Generate $U_o$ and $D_o$ by using equations (4) and (5) above;
4. Generate the transfer function $F_{UD}$ by using equation (6);
5. Find the linear frequency function $[f(\omega)=\omega\cdot]$ which optimally provides a least squares fit to the phase function PF of $F_{UD}$;
6. Determine the RMS error value between the linear function of step 5 above, and the phase function PF of $F_{UD}$;
7. Perform steps 2–6 for a range of travel time $\tau$ estimates;
8. Select the travel time $\tau_d$ for which the RMS error value is minimum;
9. The travel time $\tau_o$ is derived from the argument or phase function PF of the transfer function $F_{UD}(\omega)$, which in turn is generated by using equations (4), (5), and (6) with $\tau=\tau_d$. The value of $\tau_o$ denotes the two-way travel time from the mid-point between the vertically separated hydrophones, and the surface of the water layer.
10. The depth $d_{mp}$ of the mid-point between the dual hydrophones dmp is generated as $\tau_o$ V, where V is the velocity of sound in the water, and the vertical distance between the dual hydrophones is $d=2V\tau_d$.

Figure 2:
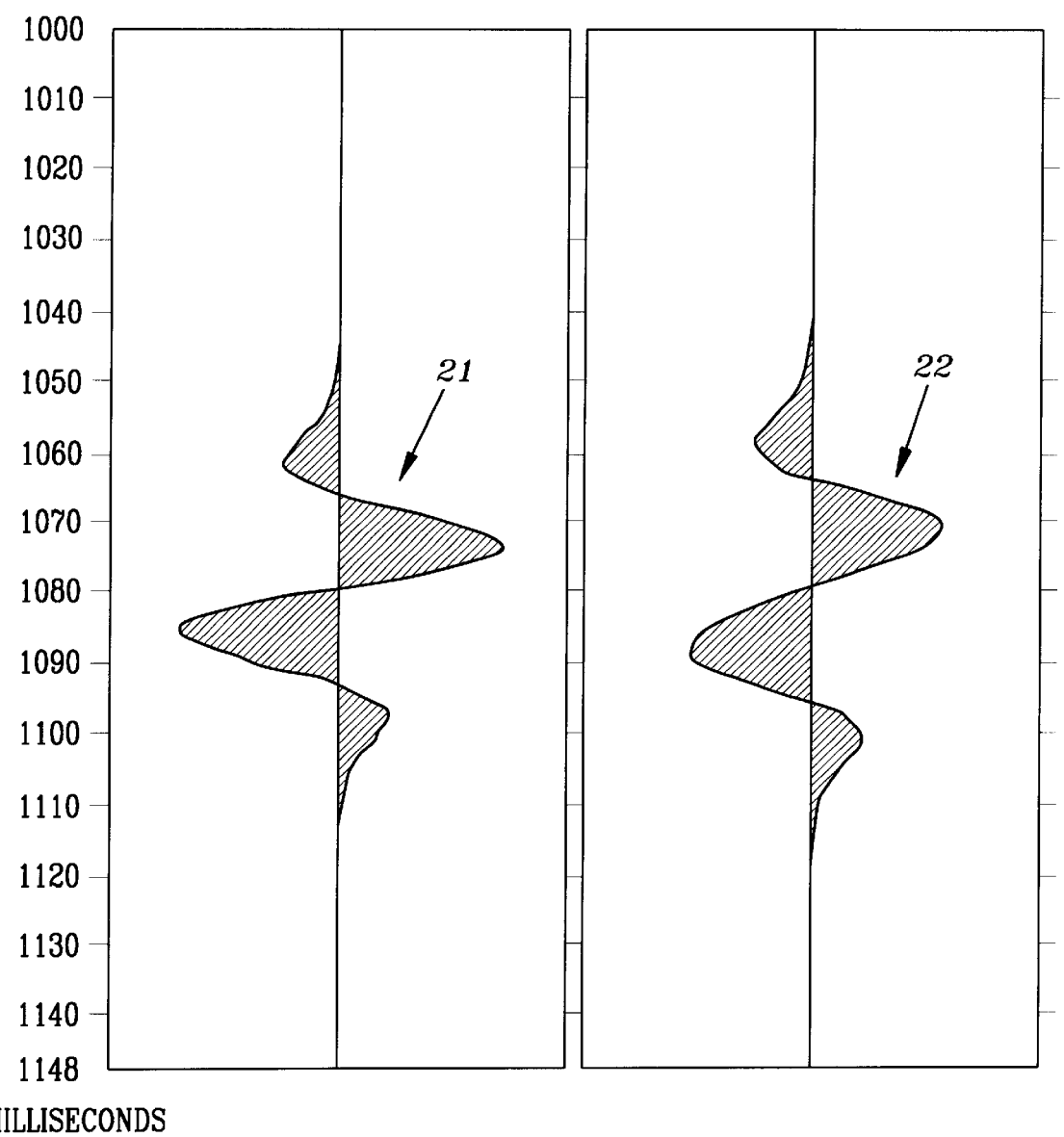
FIG. 2 is a waveform diagram of pressure signals recorded by the hydrophones of FIG. 1.

A simulated example follows to better understand the method of the present invention. FIG. 2 illustrates graphically seismic pressure signals such as those recorded by a pair of hydrophones vertically separated by 4.0 meters at a water depth of twelve meters. Tile wavefield 21 represents pressure signals recorded by the upper hydrophone, while wavefield 22 represents pressure signals recorded by the lower hydrophone.

Figure 3:
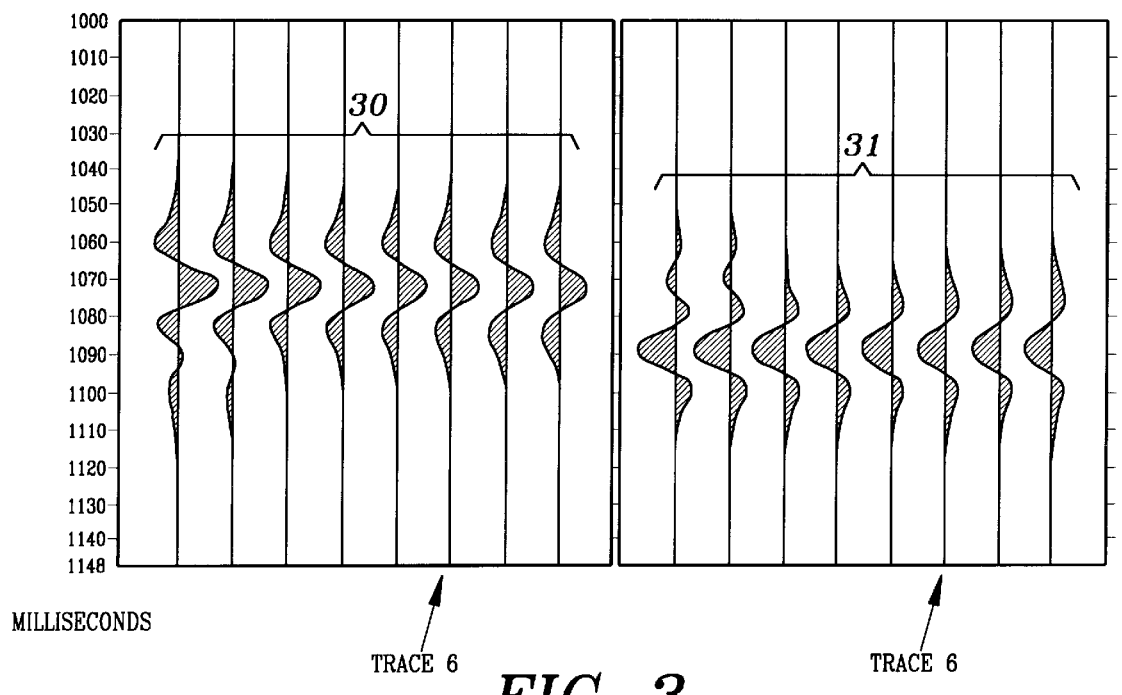
FIG. 3 is a waveform diagram of pressure signals recorded by the hydrophones of FIG. 1 for other than optimum vertical separation.

FIG. 3 illustrates the effect of the intra-receiver (phones to mid-point) travel time trial values for $\tau$ of step 2 above on the result of the wavefield separation calculation of step 3. The figure further depicts the separated up-going wavefield 30 and down-going wavefield 31 using $\tau$-values which correspond to hydrophone separations in the range of 2.0 to 6.0 meters. The up and down going traces exhibit substantially the same phase (except for a small time shift and a sign reversal), only when the assumed separation is correct as shown by trace 6 of FIG. 3 for a hydrophone separation of 4.0 meters and a water depth of 12.0 meters.

Figure 4:
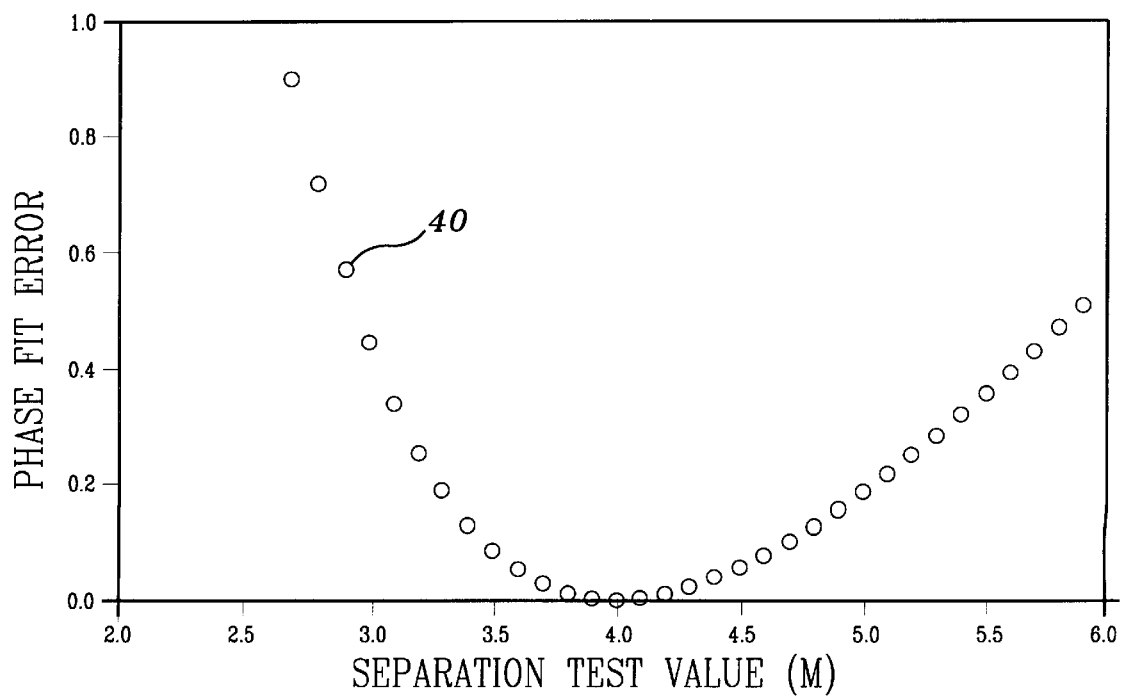
FIG. 4 is a graph of a phase fit error curve which indicates at its minimum amplitude an optimum vertical separation between the hydrophones of FIG. 1.

Referring to FIG. 4, a phase fit error curve 40 is illustrated which indicates that the error in the phase fit is at a minimum when the vertical hydrophone separation is 4.0 meters.

Phase wrapping (arguments greater than 360°) generally occurs in the determination of the transfer function $F_{UD}$, which if left unaddressed makes a direct comparison between the linear frequency function $f(\omega)$ and the phase function PF near impossible. According to a paper entitled "A New Phase Unwrapping Algorithm", given by Jose M. Tribolet, and appearing in the IEEE proceedings on "Acoustics, Speech, and Signal Processing", 1977, ASSP25, 2, pages 170–177, the phase $\phi$ of a complex number $F=X+iY$ can be expressed as:

$$\varphi = \arccos\frac{\{X\}}{|F|} = \arcsin\frac{\{Y\}}{|F|}. \text{ Thus,} \tag{7}$$

$$\cos(\varphi) = \frac{\{X\}}{|F|} \text{ and } \sin(\varphi) = \frac{\{Y\}}{|F|}. \tag{8}$$

In order to achieve a quality fit between the transfer function phase, arg ($F_{UD}$), and a linear function of frequency $f(\omega)=\omega\cdot\tau$, the above equations (7) and (8) suggest that cos ($\phi$) and cos ($\omega\cdot\tau$) may be compared to achieve the same result as comparing arg ($F_{UD}$) and $f(\omega)$. Alternatively, sin ($\phi$) and sin ($\omega\cdot\tau$) may be compared directly to avoid the phase wrapping issue.

Figure 5:
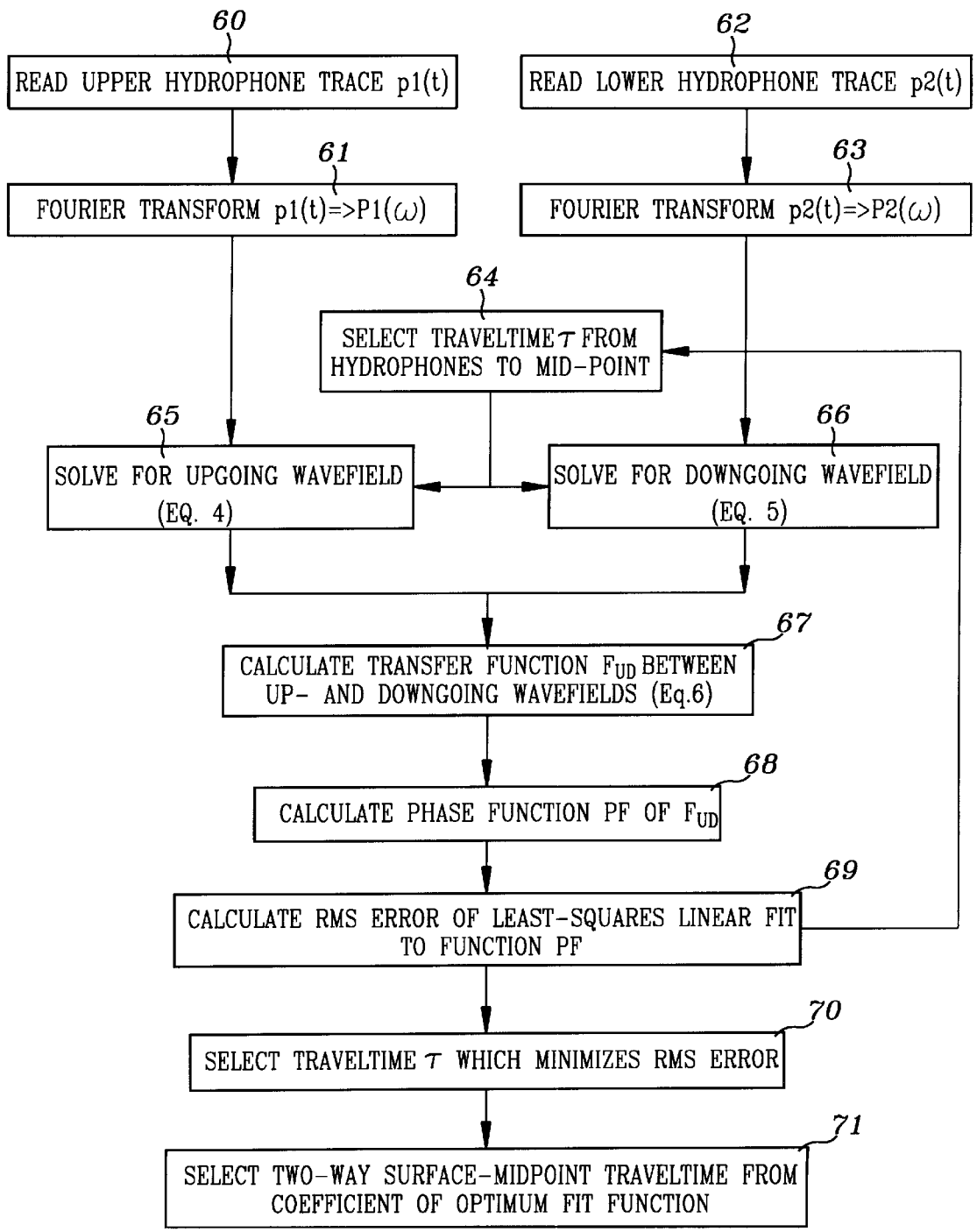
FIG. 5 is a logic flow diagram of the process used by a data processing system operating upon hydrophone recordings in selecting optimum separation and travel time values for the vertically separated hydrophones of FIG. 1.

Referring to FIG. 5, a logic flow process performed by a data processing system upon the seismic data traces recorded by the hydrophones 10 and 11 of FIG. 1A is illustrated in a logic diagram form. More particularly, the seismic trace p1(t) read by the upper hydrophone 10 of FIG. 1A is received at logic step 60, and integrated over time to provide the Fourier transform of p1 (t) as represented by P1 ($\omega$) at logic step 61. Similarly, the seismic trace p2(t) read by the lower hydrophone 11 of FIG. 1 is received at logic step 62, and integrated over time to provide the Fourier transform of p2 (t) as represented by P2 ($\omega$) at logic step 63.

At logic step 64, a travel time $\tau$ is estimated as the time for a seismic pressure wave to travel between a mid-point between the vertically spaced hydrophones and one of the hydrophones. The upgoing wavefield $Uo(\omega)$ and the downgoing wavefield $Do(\omega)$ then are determined through equations (4) and (5) above at logic steps 65 and 66, respectively, and the transfer function $F_{UD}$ is calculated from equation (6) above at logic step 67. Thereafter, the logic flow process proceeds from logic step 67 to logic step 68, where the phase function PF or arg(FUD) of the transfer function $F_{UD}$ is determined as follows:

$$PF = \arg(e^{i\omega\tau_0}) = \arg\frac{(U_o(\omega))}{(D_o(\omega))} = \omega\tau_0 \tag{9}$$

From logic step 68, the logic flow process continues to logic step 69 where the linear function which provides a least squares fit to the phase function PF is determined, and the RMS error between the linear function and the phase function PF also is determined. The determination of a least squares fit and an RMS error is well known in the relevant art, and is described in "Numerical Recipes", by W. H. Press, S. A. Teukodoky, W. T. Vetterling, and B. P. Flannery, Cambridge University Press, 1986. The steps 64 through 69 are repeated for a range of travel time $\tau$ values, and the RMS errors so determined are recorded for comparison. Thereafter, at logic step 70, the travel time $\tau_d$ associated with the minimum recorded RMS error is selected, and the logic flow process continues to logic step 71 where the function $F_{UD}(\omega)$ is calculated from equations (4), (5) and (6) above with $\tau=\tau_d$. The coefficient $\tau_o$ then is calculated from the slope of the argument of the function FUD($\omega$) as follows:

$$t_o = \frac{PF}{\omega} \tag{10}$$

$\tau_o$ thus is taken as the two-way travel time from the mid-point between the vertically separated hydrophones and the surface of the water layer.

The depth of the mid-point below the water surface, therefore is $$d_{mp} = \frac{1}{2}\tau_o V. \tag{11}$$

Although a particular embodiment of the invention has been described and illustrated herein, those skilled in the art will recognize that modifications and variations may be readily made without departing from the spirit and scope of the invention as defined in the claims, and consequently it is intended that the claims be interpreted to cover such modifications, variations, and equivalents. For example, geophones may be used instead of hydrophones.

What is claimed is:

1. A system for determining an optimal vertical travel time $\tau_d$ and a vertical mid-point depth $d_{mp}$ of dual vertically separated hydrophones below a surface of a body of water, which comprises:

a storage medium;

a recording system for receiving electrical signals from said dual vertically separated hydrophones indicative of pressure waves induced into said body of water, and storing said electrical signals in said storage medium; and a data processing system for accessing said electrical signals from said storage medium for determining said optimal vertical travel time $\tau_d$ of a pressure wave from a mid-point between said dual vertically separated hydrophones to one of said dual vertically separated hydrophones, and for determining said vertical mid-point depth $d_{mp}$ of said mid-point below said surface.

2. The system of claim 1, wherein said storage medium is one of a magnetic tape, a magnetic disk, and a magnetic floppy disk.

3. The system of claim 1, wherein said data processing system determines said optimal vertical travel time $\tau_d$ by taking Fourier transforms of said electrical signals as a function of an estimated vertical travel time $\tau$, determining an up-going wavefield function $U_o$ and a down-going wavefield function $D_o$ as functions of said Fourier transforms and said estimated vertical travel time $\tau$, generating a transfer function $F_{UD}$ between said up-going wavefield function $U_o$ and said down-going wavefield function $D_o$, taking an argument PF of said transfer function $F_{UD}$, determining a linear frequency function $f(\omega)$ which provides a least squares fit to said argument PF, measuring an RMS error between said argument PF and said linear frequency function $f(\omega)$, and thereafter repeating the above steps until said estimated travel time $\tau$ is found which results in minimum RMS error to identify said optimal vertical travel time $\tau_d$.

4. The system of claim 3, wherein a vertical separation travel time $\tau o$ denoting a two-way travel time between said mid-point and said surface is $$\frac{PF}{\omega},$$

where $\omega$ is $2\pi f$, and f is a temporal frequency.

5. The system of claim 4, wherein said depth $d_{mp}$ is equal to $$\frac{1}{2}$$

$\tau o$ V, where V is velocity of sound in water.

6. The system of claim 5, wherein a vertical separation distance d between said dual vertically separated hydrophones is $2V\tau_d$.

7. The system of claim 3, wherein said RMS error is determined by comparing cos(PF) with cos($\omega\tau$).

8. The system of claim 3, wherein said RMS error is determined by comparing sin(PF) with sin($\omega\tau$).

9. A method of determining a travel time $\tau_d$ from a mid-point between dual hydrophones vertically separated below a water surface to one of said dual hydrophones, which comprises the steps of:

integrating over time electronic signals received from said dual hydrophones to generate Fourier transforms of said electronic signals as functions of a temporal frequency f;

selecting a travel time $\tau$ for a pressure wave in water to travel from said mid-point to aid one of said dual hydrophones;

generating an up-going wavefield function $U_o$ and a down-going wavefield function $D_o$ as functions of said travel time $\tau$ and said Fourier transforms;

generating a transfer function $F_{UD}$ between said up-going wavefield function $U_o$ and said down-going wavefield function $D_o$;

performing a least squares fit to an argument PF of said transfer function $F_{UD}$ to determine an optimal linear frequency function $f(\omega)$;

measuring and recording an RMS error between said linear frequency function $f(\omega)$ and said argument PF;

repeating the above steps beginning with the step of selecting said travel time $\tau$ for a range of values for said travel time $\tau$; and selecting said travel time $\tau_d$ as a travel time $\tau$ corresponding to a minimum recorded RMS error.

10. The method of claim 9, wherein a travel time $\tau o$ representing time for a pressure wave to travel twice between said mid-point and said water surface is determined by generating said argument PF for $\tau=\tau_d$, and dividing said argument PF by $2\pi f$.

11. The method of claim 10, wherein a depth $d_{mp}$ of said mid-point below said water surface is determined as $$\frac{1}{2}$$

$\tau_o$ multiplied by a velocity V of sound in water.

12. The method of claim 9, wherein phase wrapping effects are avoided in the step of measuring and recording said RMS error by comparing cos(PF) with cos($\omega\tau$), rather than comparing said argument PF with said linear frequency function $f(\omega)$.

13. The method of claim 9, wherein phase wrapping effects are avoided in the step of measuring and recording said RMS error by comparing sin(PF) and sin($\omega\tau$), rather than comparing said argument PF with said linear frequency function $f(\omega)$.

* * * * *